United States Patent
Ranatunga et al.

(10) Patent No.: US 11,853,703 B2
(45) Date of Patent: Dec. 26, 2023

(54) PROCESSING TRANSACTIONAL FEEDBACK

(71) Applicant: eBay Inc., San Jose, CA (US)

(72) Inventors: Don Kumudu Janaka Ranatunga, Cupertino, CA (US); Marie Michelle Rhea Foster, San Jose, CA (US); Brandon An Lai, Morgan Hill, CA (US); Sanjika Hewavitharana, Milpitas, CA (US); Jason Diran, San Jose, CA (US); Canran Xu, San Jose, CA (US)

(73) Assignee: EBAY INC., San Jose, CA (US)

( * ) Notice: Subject to any disclaimer, the term of this patent is extended or adjusted under 35 U.S.C. 154(b) by 47 days.

(21) Appl. No.: 17/195,888

(22) Filed: Mar. 9, 2021

(65) Prior Publication Data

US 2021/0192145 A1    Jun. 24, 2021

Related U.S. Application Data

(63) Continuation of application No. 16/461,125, filed as application No. PCT/CN2018/087485 on May 18, 2018, now Pat. No. 10,990,764.

(51) Int. Cl.
G06F 40/30 (2020.01)
G06N 20/00 (2019.01)
H04L 51/212 (2022.01)

(52) U.S. Cl.
CPC ............ *G06F 40/30* (2020.01); *G06N 20/00* (2019.01); *H04L 51/212* (2022.05)

(58) Field of Classification Search
CPC ................................ G06F 40/30; H04L 51/212
See application file for complete search history.

(56) References Cited

U.S. PATENT DOCUMENTS 6,026,387 A    2/2000 Kesel
7,073,129 B1   7/2006 Robarts et al.
(Continued)

FOREIGN PATENT DOCUMENTS

CN    103493040 A    1/2014
CN    104462132 A    3/2015
(Continued)

OTHER PUBLICATIONS

Office Action received for Korean Patent Application No. 10-2020-7036229, dated Jan. 18, 2022, 6 pages (3 pages of English translation and 3 pages of official copy).
(Continued)

*Primary Examiner* — Kevin Ky
(74) *Attorney, Agent, or Firm* — SCHWEGMAN LUNDBERG & WOESSNER, P.A.

(57) ABSTRACT

Disclosed are systems and methods for receiving a plurality of comments at a particular phase of a transaction with a member of a networked system, classifying one or more of the plurality of comments into one of a set of predetermined sentiment classifications, applying a trained machine learning system to select a category from a set of predefined categories for each of the one or more comments, applying a natural language processing module to generate a sub-category for each of the one or more comments, associating the generated sub-categories with their respective categories for the one or more comments, and generating a display of the determined categories for the particular transaction with the generated sub-categories, each generated sub-category being graphically connected to their respective categories.

20 Claims, 10 Drawing Sheets

(56) References Cited

U.S. PATENT DOCUMENTS

| | | |
|---|---|---|
| 7,370,285 B1 | 5/2008 | Nickerson et al. |
| 8,386,335 B1 | 2/2013 | Cohen |
| 8,538,790 B2 | 9/2013 | Nickerson et al. |
| 8,977,631 B2 | 3/2015 | Sundaresan et al. |
| 9,201,955 B1* | 12/2015 | Quintao .............. G06F 40/284 |
| 9,396,490 B1* | 7/2016 | Marx ................ G06Q 30/0282 |
| 9,633,007 B1* | 4/2017 | Brun ................ G06F 16/9024 |
| 10,878,500 B2* | 12/2020 | Al-Masoud ........... G06F 16/951 |
| 10,990,764 B2 | 4/2021 | Ranatunga et al. |
| 2007/0038620 A1* | 2/2007 | Ka ....................... G06F 16/951 707/999.005 |
| 2011/0078167 A1* | 3/2011 | Sundaresan ............ G06F 40/30 707/765 |
| 2013/0166565 A1* | 6/2013 | Lepsoe ................ G06F 16/358 707/740 |
| 2014/0188897 A1 | 7/2014 | Baker et al. |
| 2014/0201126 A1* | 7/2014 | Zadeh .................... A61B 5/165 706/52 |
| 2014/0337257 A1* | 11/2014 | Chatterjee ............. G06N 20/00 706/12 |
| 2014/0365207 A1* | 12/2014 | Convertino ........... G06F 40/279 704/9 |
| 2015/0089409 A1 | 3/2015 | Asseily et al. |
| 2015/0286710 A1* | 10/2015 | Chang .................... G06F 16/36 706/12 |
| 2017/0011029 A1* | 1/2017 | Chatterjee ............. G06N 5/027 |
| 2017/0161633 A1* | 6/2017 | Clinchant ............. G06N 20/00 |
| 2017/0206603 A1* | 7/2017 | Al-Masoud ........... H04L 9/3236 |
| 2017/0249384 A1* | 8/2017 | Kandylas ............. G06F 16/358 |
| 2017/0345079 A1* | 11/2017 | Rangan ................ G06F 16/951 |
| 2018/0075368 A1* | 3/2018 | Brennan ............... G06N 5/022 |
| 2018/0089572 A1* | 3/2018 | Aili ........................ G06F 9/453 |
| 2018/0137444 A1* | 5/2018 | Kakkad ............. G06Q 10/0639 |
| 2018/0276710 A1* | 9/2018 | Tietzen ............. G06Q 30/0269 |
| 2018/0308159 A1* | 10/2018 | Knijnik .................. G06N 20/20 |
| 2019/0102614 A1* | 4/2019 | Winder ................. G06F 40/42 |
| 2019/0197433 A1* | 6/2019 | Saha ..................... G06N 5/022 |
| 2019/0332694 A1* | 10/2019 | Tcherechansky ... G06F 16/5866 |
| 2021/0064824 A1 | 3/2021 | Ranatunga et al. |

FOREIGN PATENT DOCUMENTS

| | | |
|---|---|---|
| CN | 107818487 A | 3/2018 |
| CN | 107967260 A | 4/2018 |
| WO | 2001/033410 A2 | 5/2001 |
| WO | 2019/218343 A1 | 11/2019 |

OTHER PUBLICATIONS

International Search Report received for PCT Application No. PCT/CN2018/087485, dated Feb. 18, 2019, 3 pages.

International Written Opinion received for PCT Application No. PCT/CN2018/087485, dated Feb. 18, 2019, 4 pages.

Notice of Allowance Received for U.S. Appl. No. 16/461,125, dated Jan. 6, 2021, 10 Pages.

International Preliminary Report on Patentability received for International Application No. PCT/CN2018/087485, dated Dec. 3, 2020, 6 pages.

"U.S. Appl. No. 16/461,125, Preliminary Amendment filed May 15, 2019", 3 pgs.

"U.S. Appl. No. 16/461,125, 312 Amendment filed Mar. 4, 2021", 8 pgs.

"U.S. Appl. No. 16/461,125, PTO Response to Rule 312 Communication dated Mar. 12, 2021", 2 pgs.

"U.S. Appl. No. 16/461,125, PTO Response to Rule 312 Communication dated Mar. 29, 2021", 2 pgs.

"Korean Application Serial No. 10-2022-7037238, Notice of Preliminary Rejection dated Jul. 31, 2023", W English Translation, 6 pgs.

* cited by examiner

PROCESSING TRANSACTIONAL FEEDBACK

CROSS REFERENCE TO RELATED APPLICATIONS

This application is a continuation of U.S. patent application Ser. No. 16/461,125 by Ranatunga et al., entitled "Processing Transactional Feedback." filed May 15, 2019; which is a U.S. National Stage Filing under 35 U.S.C. § 371 from International Patent Application No. PCT/CN2018/087485 by Ranatunga et al., entitled "Processing Transactional Feedback," filed May 18, 2018; each of which is hereby incorporated by reference in its entirety.

TECHNICAL FIELD

Embodiments of the present disclosure relate to processing transactional feedback, and more particularly, to processing transactional feedback for efficient user access, automated trend identification, and user notification.

BACKGROUND

Conventionally, as users of a networked system provide feedback for a transaction, there is limited organization with feedback typically being arranged linearly. In other examples, the feedback is arranged or filtered according to the feedback being positive, negative, or neutral. Although the user may arrange the feedback in different ways, additional conclusions regarding the state of the transactional system is usually done by the user (e.g., the recipient of the feedback).

BRIEF DESCRIPTION OF THE DRAWINGS

Various ones of the appended drawings merely illustrate example embodiments of the present disclosure and cannot be considered as limiting its scope.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In certain embodiments, a system, as described herein, is specially configured to receive a plurality of comments at a particular phase of a transaction with a member of an online marketplace. For example, a particular phase may be a purchasing phase of a transaction.

The system then classifies the comments into a sentiment classification according to term included in the respective comments. Then, the system generates a sub-category for the comment by applying a natural language processing module. The generated sub-category is, in certain embodiments, not selected from a set of predetermined sub-categories but is, rather, generated according to the language included in the respective comment.

In another example embodiment, the system is configured to present a user interface allowing a user to select categories or sub-categories and filters the messages according to the selected categories (including newly generated sub-categories).

In one particular example embodiment, the system notifies a user in response to a change in a trend for a certain category. For example, in response to an increase in complaints regarding the selection of an item to purchase, the system may determine an increased likelihood of an error or fault in the selection mechanisms and notify the user. This particular benefit includes the system identifying a likely error and notifying the user without the user reviewing the comments. Other technical benefits are described herein.

Figure 1:
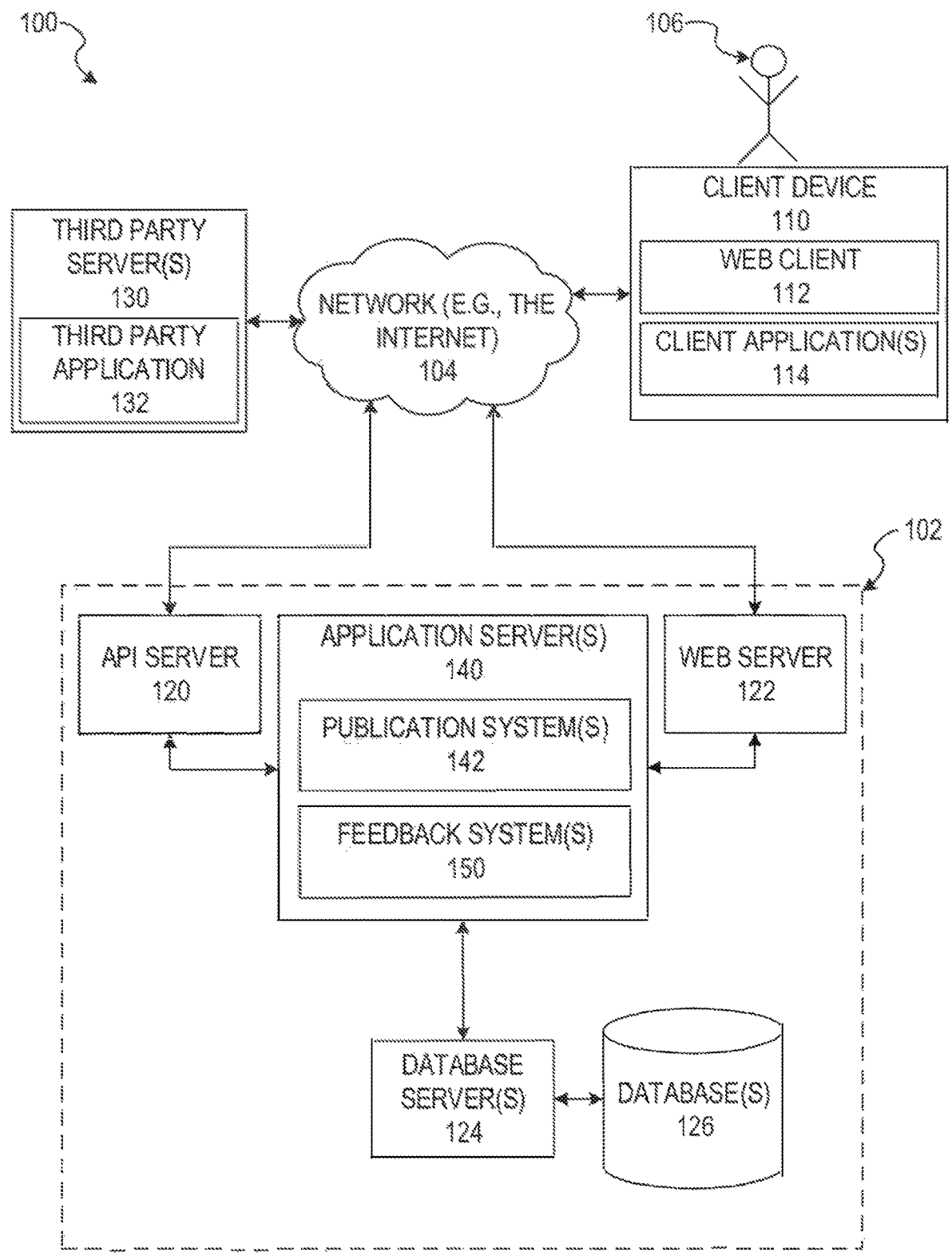
FIG. 1 is a block diagram illustrating a system, according to some example embodiments.

With reference to FIG. 1, an example embodiment of a high-level client-server-based network architecture 100 is shown. A network system 102 provides server-side functionality via a network 104 (e.g., the Internet or wide area network (WAN)) to one or more client devices 110. FIG. 1 illustrates, for example, a web client 112 (e.g., web a browser), client application(s) 114, executing on the client device 110.

The client device 110 may comprise, but is not limited to, a mobile phone, desktop computer, laptop, personal digital assistant (PDA), smart phone, tablet, ultra-book, netbook, laptop, multi-processor system, microprocessor-based or programmable consumer electronics, game console, set-top box, or any other communication device that a user may utilize to access the network system 102. In some embodiments, the client device 110 may comprise a display module (not shown) to display information (e.g., in the form of user interfaces). In further embodiments, the client device 110 may comprise one or more of a touch screen, accelerometer, gyroscope, camera, microphone, global positioning system (GPS) device, and so forth. The client device 110 may be a device of a user that is used to perform a transaction involving digital items within the network system 102. In one embodiment, the network system 102 is a network-based marketplace that responds to requests for product listings, publishes publications comprising item listings of products available on the network-based marketplace, and manages payments for these marketplace transactions.

One or more users 106 may be a person, a machine, or other means of interacting with the client device 110. In embodiments, the user 106 is not part of the network architecture 100, but may interact with the network architecture 100 via the client device 110 or another means. For example, one or more portions of the network 104 may be an ad hoc network, an intranet, an extranet, a virtual private network (VPN), a local area network (LAN), a wireless LAN (WLAN), a WAN, a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each client device 110 may include one or more applications (also referred to as "apps") such as, but not limited to, a web browser, messaging application, electronic mail (email) application, an e-commerce site application (also referred to as a marketplace application), and the like. In some embodiments, the client device 110 may include an application that is configured to locally provide the user interface and at least some of the functionalities with the application configured to communicate with the network system 102, on an as needed basis, for data and/or processing capabilities not locally available (e.g., access to a database of items available for sale, to authenticate a user 106, to verify a method of payment, etc.). Conversely, in other embodiments, the client device 110 may use its web browser to access a site (or a variant thereof) hosted on the network system 102.

In example embodiments, the user 106 is not part of the network architecture 100, but may interact with the network architecture 100 via the client device 110 or other means. For instance, the user 106 provides input (e.g., touch screen input or alphanumeric input) to the client device 110 and the input is then communicated to the network system 102 via the network 104. In this instance, the network system 102, in response to receiving the input from the user 106, communicates information to the client device 110 via the network 104 to be presented to the user 106. In this way, the user 106 can interact with the network system 102 using the client device 110.

An application program interface (API) server 120 and a web server 122 are coupled to, and provide programmatic and web interfaces respectively to, one or more application server(s) 140. The application server(s) 140 may host one or more publication systems 142 which may comprise one or more modules or applications and each of which may be embodied as hardware, software, firmware, or any combination thereof. The application server(s) 140 are, in turn, shown to be coupled to one or more database servers 124 that facilitate access to one or more information storage repositories or database(s) 126. In an example embodiment, the database(s) 126 are storage devices that store information to be posted (e.g., publications) to the publication system(s) 142. The database(s) 126 may also store digital item information in accordance with example embodiments.

A third party application 132, executing on third party server(s) 130, is shown as having programmatic access to the network system 102 via the programmatic interface provided by the API server 120. For example, the third party application 132, utilizing information retrieved from the network system 102, supports one or more features or functions on a website hosted by the third party.

The publication system(s) 142 may provide a number of publication functions and services to users 106 that access the network system 102. While the publication system 142 is shown in FIG. 1 to both form part of the network system 102, it will be appreciated that, in alternative embodiments, the publication system 142 may form part of a service that is separate and distinct from the network system 102.

Further, while the client-server-based network architecture 100 shown in FIG. 1 employs a client-server architecture, the present inventive subject matter is, of course, not limited to such an architecture, and could equally well find application in a distributed, or peer-to-peer, architecture system, for example. The publication system 142, and feedback system 150, could also be implemented as stand-alone software programs, which do not necessarily have networking capabilities.

The web client 112 may access the publication system 142 via the web interface supported by the web server 122. The programmatic client accesses the various services and functions provided by the publication system 142 via the programmatic interface provided by the API server 120. The programmatic client may, for example, be a publisher application to enable users 106 to author and manage publications on the network system 102 in an off-line manner, and to perform batch-mode communications between the programmatic client and the network system 102.

In certain example embodiments, the 3D integration system 146 generates the 3D model to be displayed using the web client 112. In one example, the 3D integration system 146 generates the model, stores the model at a remote server, and returns a universal resource locator (URL) to access the model using the web client 112.

Additionally, a third party application(s) 132, executing on a third party server(s) 130, is shown as having programmatic access to the network system 102 via the programmatic interface provided by the API server 120. For example, the third party application 132, utilizing information retrieved from the network system 102, may support one or more features or functions on a website hosted by the third party.

In one example embodiment, the feedback system 150 is configured to receive comments for a particular phase of a transaction with a member of the network system 102, determine a sentiment and a category of comments, where the category is selected from a set of predefined categories, generate a sub-category by applying a natural language processing module, and generate a display allowing a user 106 to select a category, or sub-category, and filter the comments according to the selection by the user 106. In this way, the feedback system 150 provides quick access to feedback comments that are related to the selected category.

Figure 2:
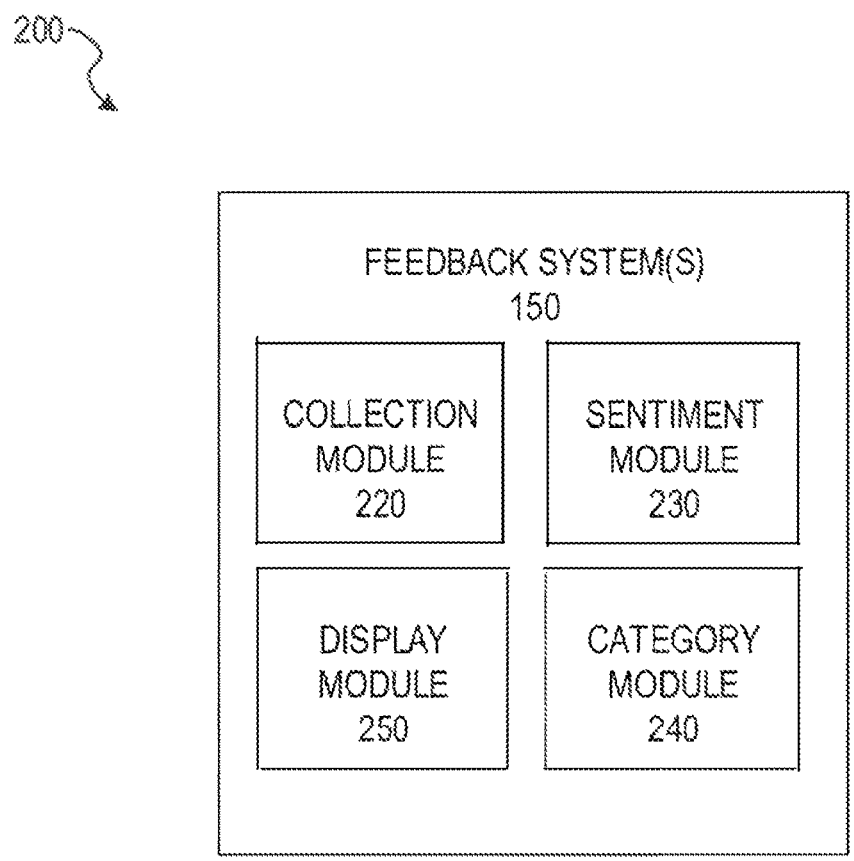
FIG. 2 is a block diagram depicting a feedback system, according to one example embodiment.

FIG. 2 is a block diagram depicting a feedback system 150, according to one example embodiment. In this example embodiment, the feedback system 150 includes a collection module 220, a sentiment module 230, a display module 250, and a category module 240.

In one example embodiment, the collection module 220 is configured to receive a plurality of comments at a particular phase of a transaction with a member of an online marketplace. In certain embodiment, the collection module 220 retrieves comments by querying a database 126 of comments. For example, the network system 102 may receive comments from an application server 140 that is configured to request comments from users 106 using the network system 102 and store the comments in the database 126.

As one skilled in the art may appreciate, the collection module 220 may also receive comments in many other ways. For example, the collection module 220 may load comments from storage, receive comments over an electronic network interface, or in any other way.

In one example embodiment, the particular phase of a transaction includes a particular step in completing a transaction between two users 106 of the networked system 102. Examples include, but are not limited to: item selection, display, identity verification, item options selections, shopping cart management, checkout, payment, delivery options selections, returns management, or other, or the like.

In one example embodiment, the sentiment module 230 is configured to classify one of the comments according to text included in the comment. For example, the comment text may include, "I hate it when . . . ," "this site stinks," or the like and, in response, the sentiment module 230 determines that the sentiment for the comment is negative. In other examples, the sentiment module 230 identifies a sentiment according to specific terms included in the comment. For example, text of the comment includes terms like "awesome," "wonderful," "perfect," "love," or other teams that indicated pleasure, acceptance, satisfaction, or the like, and the sentiment module 230 determines that the sentiment of the comment is positive. In another example, the sentiment module 230 classifies a comment as "neutral" in response to none of the terms in the comment matching a term associated with either the "positive" classification or the "negative" classification. In one specific example embodiment, the sentiments are selected from a set of predefined sentiments, such as, but not limited to, "positive," "negative," and "neutral.

In another example embodiment, the sentiment module 230 applies a machine learning system (FIG. 3: 270) that outputs a sentiment classification in response to receiving the comment, or the text of the comment. Further example embodiments of the machine learning system 270 are described in relation to FIG. 3. In one non-limiting example, the sentiment module 230 employs a trained machine learning system to output a sentiment classification in response to receiving the text of the comment.

For example, an administrator of the feedback system 150 may train a machine learning system 270 on a large database of comments that have been manually classified into a sentiment classification by humans. The machine learning system 270 trains on this data and is then configured to output a sentiment classification in response to receiving text of the message or a set of terms that are included in the message.

In another example embodiment, the category module 240 is configured to determine a category for the comment selected from a set of predefined categories. In certain embodiments, such categories include, but are not limited to: a bug, operating correctly, a compliment, feature request, a complaint, a related comment, unclassified, a recommendation, or other.

In one example embodiment, the category module 240 determines a category for the comment according to specific terms that are included in the comment. In one example, the comment includes "I hate it when . . . " In response, the category module 240 classifies the comment as a complaint. In another example, the comment includes "broken," and the category module 240 determines that the comment is a declaration of a bug. In another example, a comment includes "I love it," and the category module 240 determines that the comment is a compliment. In another example, the comment includes, "need to add" and the category module 240 determines that the comment is a feature request.

In one example embodiment, the category module 240 tokenizes each term in the comment and looks up the term in a database of terms and/or phrases. For example, if the comment includes the phrase "can't pay" the category module 240 determines that the comment is a complaint because the phrase "can't pay" in found in a database of phrases that have been associated with a complaint.

In one example embodiment, the category module 240 determines a category for a comment in response a number of term in the message matching a highest number of terms in a database of terms associated with a particular category.

For example, where four terms are associated with a "bug" category and three terms are associated with a "complaint" category, the category module 240 determines that the comment is a "bug" because more terms matched the category "bug" than other categories.

In another example embodiment, the category module 240 loads a set of associations from a remote database of association between specific terms and a category. In this example embodiment, the category module 240 loads the associations from the database 126 and determines the category for a comment according to one or more of the associations. Furthermore, in this example embodiment, an administrator of the feedback system 150 may add associations to the database 126 and the category module 240 automatically determines a category for a comment according to the newly added association.

In another example embodiment, the category module 240 applies a trained machine learning system (FIG. 2: 270), that outputs a category in response to receiving the comment as input. For example, an administrator of the feedback system 150 may train a machine learning system 270 on terms found in comments and a selected category. In this way, the machine learning system 270 is configured to output a category in response to receiving a set of terms found in a comment. Further example embodiments that include the machine learning system 270 are described in relation to FIG. 3.

In one example embodiment, the category module 240 applies a natural language processing module to the comment to generate a sub-category for the comment. In contrast with the category, which is selected from a set of predetermined categories, the sub-category is generated without regard to a set of predefined sub-categories. In one example, the category module 240 generates a sub-category of "technical problem with imagery."

In this example embodiment, the category is "a bug" and the generated sub-category is "technical problem with imagery." Accordingly, the sub-category of "technical problem with imagery," is associated with the category of "bug" because at least one comment was classified as "a bug" and further sub-classified as "technical problem with imagery." Therefore, as additional sub-categories are generated, they are associated with the respective categories based on comments that are classified and sub-classified accordingly.

Figure 4:
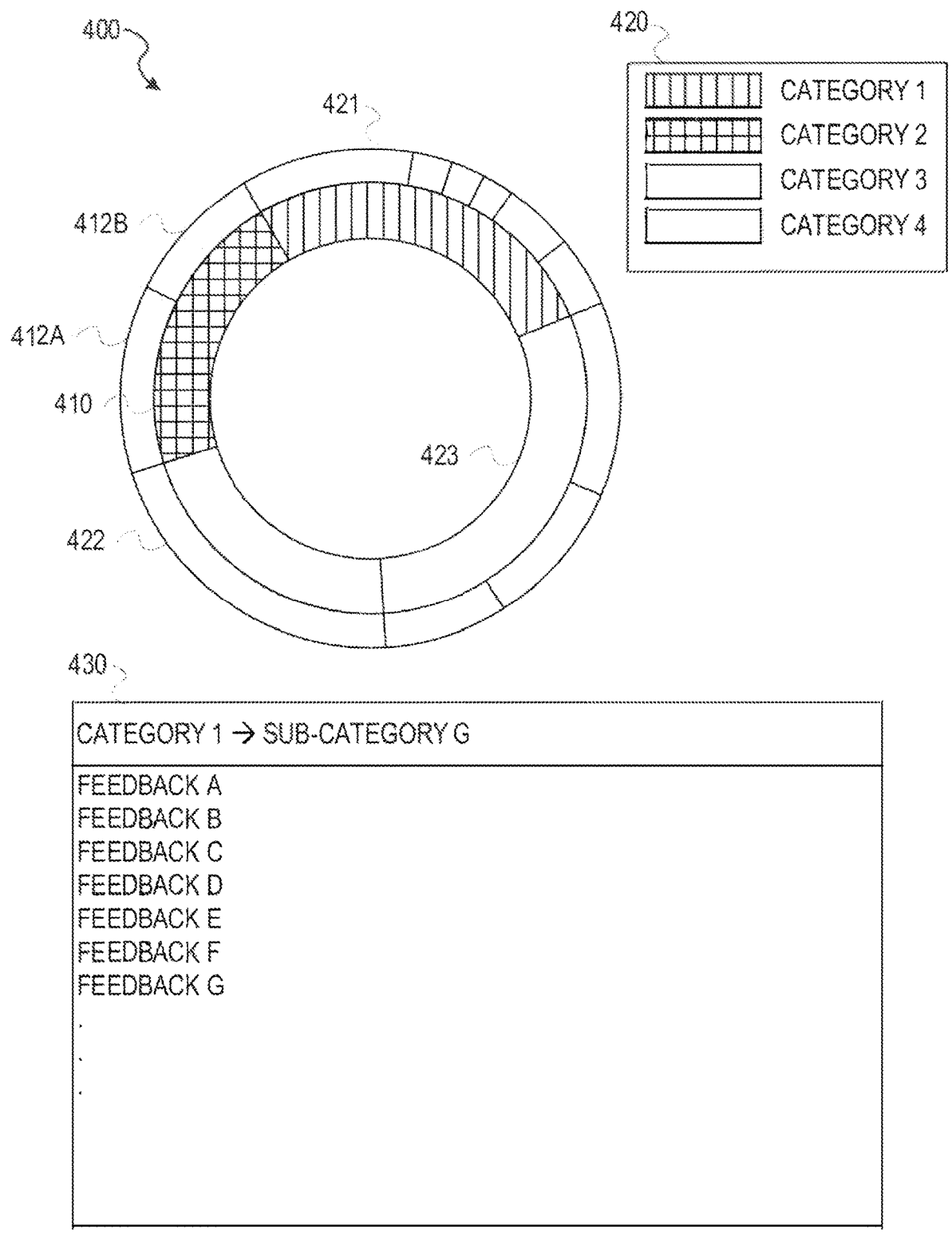
FIG. 4 is an illustration depicting a user interface generated by a feedback system, according to one example embodiment.

In one example embodiment, the display module 250 is configured to generate a display of the categories associated with the particular phase of the transaction as previously described. In this example embodiment, the generated display includes each of the categories as well as a set of graphical elements representing each of the generated sub-categories. A specific example of such a display is depicted in FIG. 4.

In other example embodiments, the sub-categories that are associated with the categories are connected in the generated display. In one example, the sub-categories are placed directly next to the associated category. In another example, graphical elements representing the sub-categories are connected to graphical elements representing the categories via a graphical line, or other connecting graphical element.

Accordingly, a user 106 of the networked system 102 desiring to review comments associated with a particular phase of a transaction may select the phase and, in response, the display module 250 generates the display showing the categories and associated sub-categories that were generated based on the comments.

In one example embodiment, the display module 250 receives a selection of a category and, in response, filters comments to display those comments that are associated with the category selection. For example, the comments that were assigned the selected category are displayed while other comments that were not assigned the selected category are not displayed.

In one example embodiment, the display module 250 increases a graphical size of the selected category in response to the selection. This may further clarify to the user 106 which category was selected and serve as a reminder to the user 106 how the displayed comments are filtered.

In another example embodiment, the display module 250 receives a selection of a sub-category and, in response, highlights the selected sub-category, displays a title describing the selected sub-category, and filters the displayed comments that were associated with the sub-category.

Figure 3:
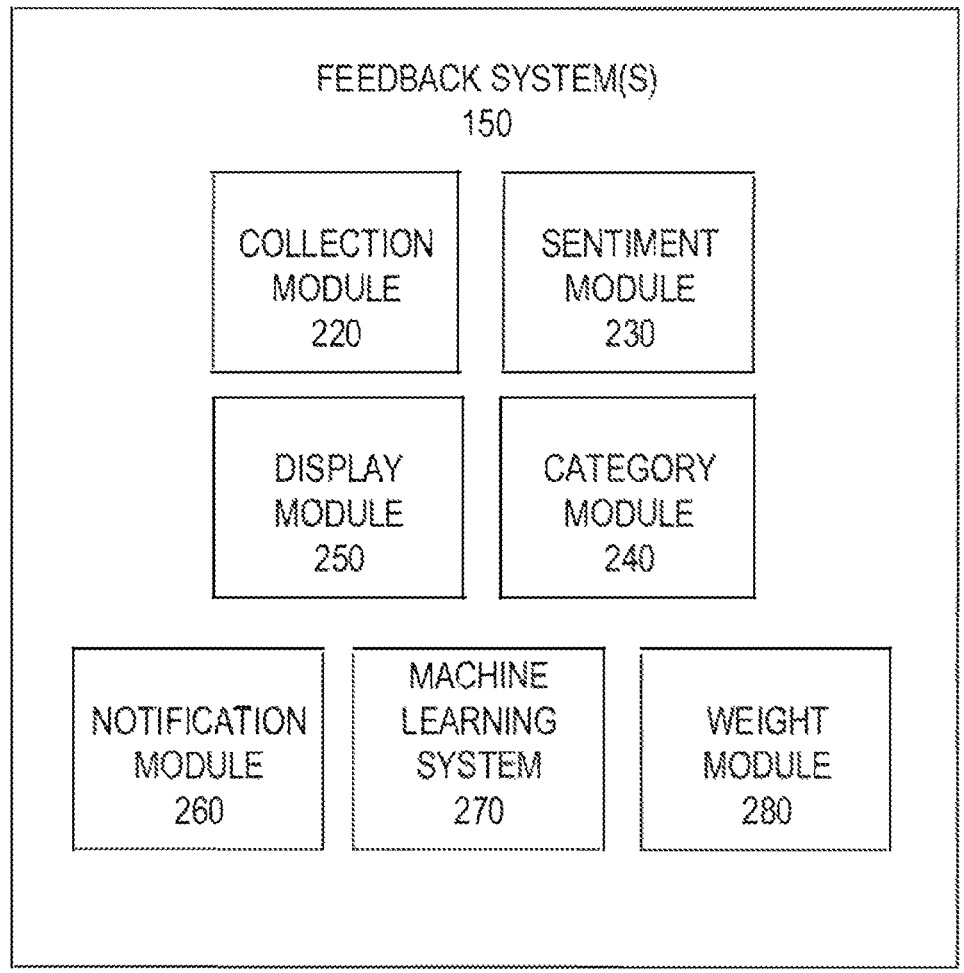
FIG. 3 is a block diagram depicting a feedback system, according to another example embodiment.

FIG. 3 is a block diagram 300 depicting a feedback system, according to another example embodiment. This example embodiment includes a collection module 220, a sentiment module 230, a display module 250, a category module 240, a notification module 260, a machine learning system 270, and a weight module 280. The collection module 220, the sentiment module 230, the display module 250, and the category module 240 may or may not be substantially similar to those depicted in FIG. 2.

In one example embodiment, the notification module 260 is configured to alert the user 106 in response to a change in a trend in one of the categories. In one example embodiment, a trend for a category includes less than five comments per day. For example, a particular user 106 may have received less than five comments regarding payment per day each day over the past month that are related to complaints regarding payment. Therefore, a trend for complaints regarding payment may be less than five comments per day.

In one example embodiment, in response to receiving more than 10 complaints regarding payment in a given day, or response to more than 10 complaints regarding payment for a consecutive threshold number of days, the notification module 260 determines that there is a significant change in a trend for comments associated with a particular category. Of course, other changes in trend may be determined by the notification module 260, as one skilled in the art may appreciate, and this disclosure is meant to include all such changes in trend.

Other examples of trends for a given category include related comments per month, comments per hour, or the like. Changes in a trend include, but are not limited to, comments exceeding 200% of a trend, 300%, or any other change in a trend.

In one example embodiment, alerting the user 106 includes transmitting an email to the user 106, transmitting an SMS text message to the user 106, displaying a notification to the user 106 via an electronic graphical user interface, or any other electronic or digital communication, as one skilled in the art may appreciate.

In another example embodiment, the machine learning system 270 is configured to output a category for a comment in response to receiving text of the comment. In one example, the machine learning system 270 is trained by an administrator of the system by providing a set of comments with categories. In response, the machine learning system 270 trains on the set of comments and learns to output a category based on text of a comment.

In one example embodiment, the weight module 280 applies a weight for each comment according to a user feedback score for the user 106 providing the comment.

As one skilled in the art may appreciate, there are many different metrics to determine a quality of feedback by a user 106. Some examples include length of the feedback, sophistication of terms used in the comment, grammar quality of the comment, whether the user 106 purchased the product commenting on, whether the user 106 engaged in an actual transaction, an amount of business, or other aspects of the user 106 providing the comment. In one example embodiment, the display module 250 filters comments to those comments from users 106 who exceed a certain threshold user weight.

In another example embodiment, the feedback system 150 selects a natural language processing module according to the determined category. For example, an administrator of the feedback system 150 may customize a natural language processing module for each category and the feedback system 150 may select a natural language processing module to use to generate the sub-category according to the selected category.

FIG. 4 is an illustration depicting a user interface 400 generated by a feedback system 150, according to one example embodiment. In one example embodiment, the user interface 400 includes a legend 420, a sundial display 421 for categories and sub-categories, and a display 430 for comments that are associated with the categories.

In one example embodiment, the legend 420 provides a mapping between certain categories and a color or pattern. In this example embodiment, the sundial 421 includes an outer ring 422 and an inner ring 423. The inner ring 423 includes a graphical section for each of the predetermined categories. The outer ring 422 includes a graphical section for each of the generated categories for the respective category in the outer ring 422.

In one example embodiment, the display module 250 adjusts a size of a graphical section 410 of an inner ring 423 according to a percentage of comments that were mapped to a category represented by the section. For example, in response to 50% of the comments being mapped to the category represented by the graphical section 410, the display module 250 adjusts the size of the graphical section 410 to encompass 50% of the inner ring 423. Accordingly, the display module 250 displays an inner ring 423 that accurately represents the respective percentages of comments mapped to the respective categories.

In another example embodiment, as with the inner ring 423, the display module 250 also adjusts the sizes of the graphical segments 412 according to a percentage of comments that were mapped to the particular graphical segment 412. Also, in this example embodiment, the display module 250 places the graphical segments 412A, 412B in the outer ring 422 to be in contact with the graphical section 410 in the inner ring 423 in response to the graphical segments 412 representing sub-categories that are associated with the category represented by the graphical section 410.

In one example embodiment, the display module 250 filters comments in a portion of the display 430 that displays filtered comments. For example, in response to a user 106 selecting the graphical element 423, the display module 250 filter the comments to display only those comments that were mapped to the category represented by the selected graphical segment 423. Furthermore, in response to the user 106 selecting the graphical segment 412A, the display module 250 filters the comments to display only those comments that were mapped to the sub-category represented by the selected graphical segment 412A.

In another example embodiment, the display module 250 generates a row of categories that were selected from a set of comments with graphical elements for each of the categories being sized according to a percentage of comments that were associated with the respective categories. Attached to the row of categories, in this example embodiment, is another row of the generated sub-categories wherein each graphical element representing a sub-category touches the graphical element for the category associated with the sub-category. For example, "touches" may at least include the graphical element for the sub-category being rendered to displayed using at least one pixel that is neighboring at least one pixel of the graphical element for the associated category.

Figure 5:
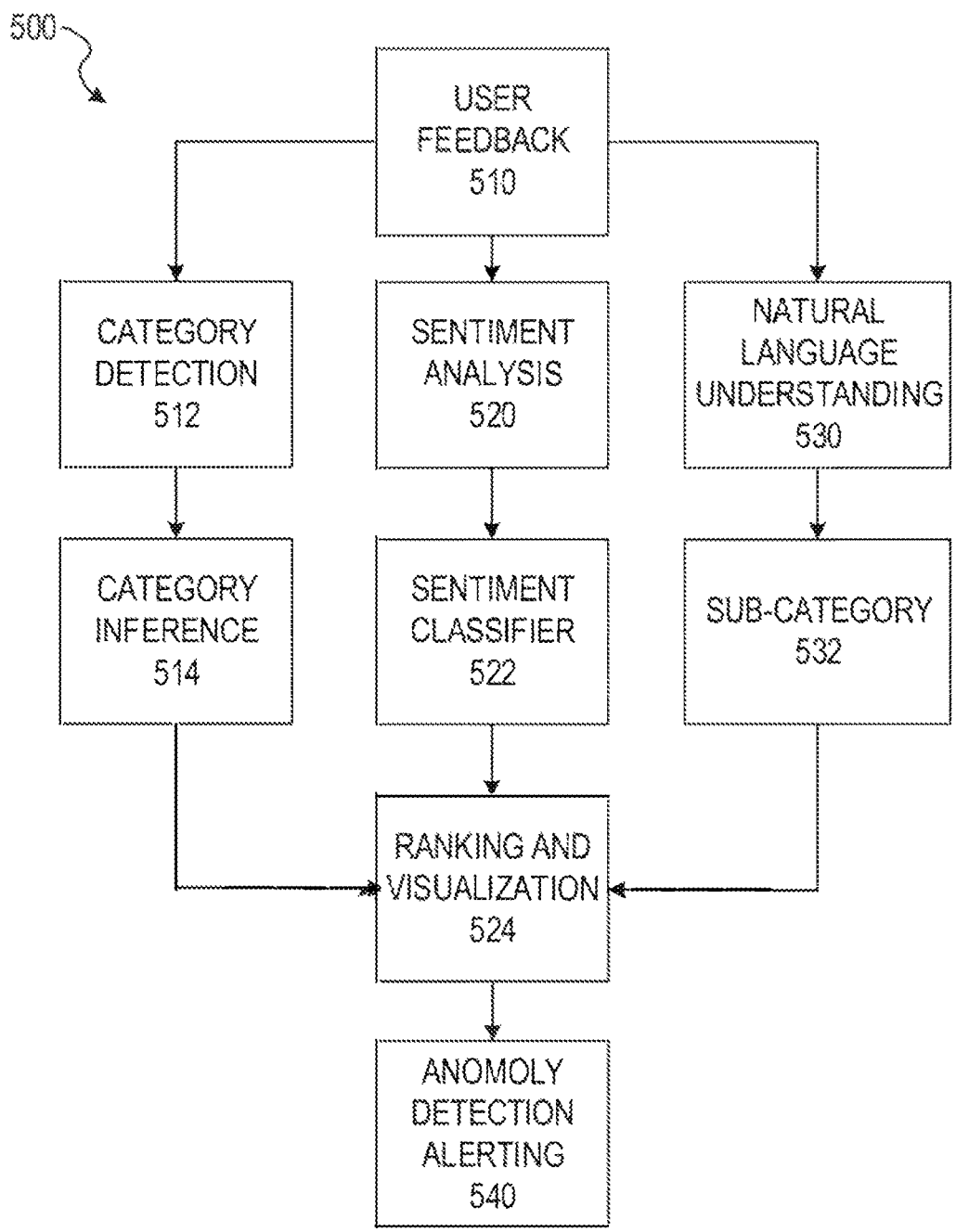
FIG. 5 is a data flow diagram illustrating a flow of data, according to one example embodiment.

FIG. 5 is a data flow diagram illustrating a flow of data, according to one example embodiment. In this data flow diagram 500 the collection module 220 receives user feedback 510.

First, the feedback system 150 performs a semi-supervised category detection 512 to identify a theme or topic for the feedback, such as by using word embedding to extract keywords from the feedback. This category detection is performed in a hierarchal manner, allowing selection of a category in a deep hierarchy of categories. The feedback system 150 then infers a category (or topic) at 514, such as by using a Naïve Bayes classifier. The feedback (e.g., individual comments or submissions) can then be classified into one or more of the inferred categories. Although word embedding and Naïve Bayes is discussed, other data mining, machine learning, or deep learning techniques can be used.

In one example embodiment, either concurrently or at a different point in time, the feedback system 150 performs sentiment analysis 520 on the feedback to identify one or more sentiment classifications, such as but not limited to positive, negative, or neutral. The feedback system 150 then classifies 522 the feedback into one or more of the inferred sentiment classifications based on comments included in the feedback.

The feedback system 150 can include hardware or software components to perform natural language analysis or processing of the customer feedback to generate an understanding 530 of the feedback, such as to extract or generate one or more sub-categories 532. Such software or hardware modules can include implementations of a selection of artificial intelligence or machine learning techniques for performing natural language processing tasks, such as syntax analysis including segmentation and part-of-speech tagging, semantics analysis including intent detection, discourse analysis including automatic summarization and entity/attribute extraction, and speech recognition. The one or more sub-categories 532 can include one or more attributes of the feedback, such as a summary of the key or most important information in the feedback.

In another example embodiment, the feedback system 150 then combines the determined category, sentiment, and generated sub-category in a ranking and visualization step 524, such as in a visual display. In this step 524, the display module 250 may rank or display comments (e.g., based on category, sentiment, and generated sub-category of the comments) in a variety of different ways as described herein. Furthermore, the notification module 260 may perform anomaly detection and/or alerting 540 in response to identifying a trend in user feedback or comments.

Figure 6:
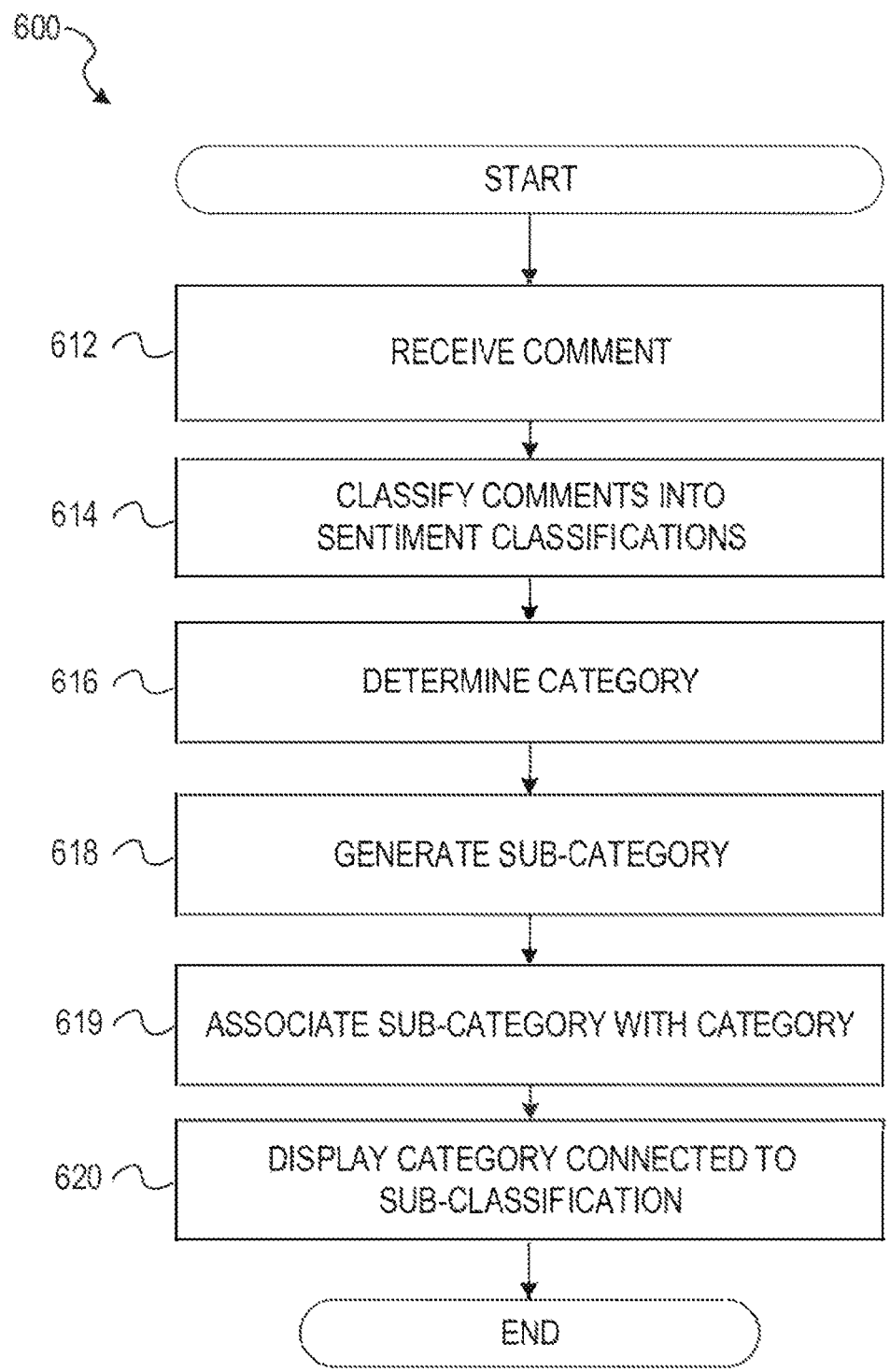
FIG. 6 is a flow chart diagram illustrating a method for processing feedback, according to one example embodiment.

FIG. 6 is a flow chart diagram illustrating a method 600 for processing feedback, according to one example embodiment. Operations in the method 600 may be performed by the feedback system 150, using modules described above with respect to FIG. 2.

In one example embodiment, the method 600 begins, and at operation 612, the collection module 220 receives a plurality of comments at a particular phase of a transaction with a member of an online marketplace. For example, the collection module 220 may receive the comments via a web page transmitted via an application server 140 operating as part of the network system 102.

The method 600 continues at operation 614 and the sentiment module 230 classifies one or more of the plurality of comments into a sentiment classification. For example, the sentiment module 230 may apply a trained machine learning system 270 to the comment and accept the output (e.g., an indicated sentiment classification) of the trained machine learning system 270.

The method 600 continues at operation 616 and the category module 240 determines a category for each of the one or more comments in the plurality of the comments, the category selected from a set of predefined categories. The method 600 continues and at operation 618 the category module 240 applies a natural language processing module to the comment to generate a sub-category associated with the selected category. In certain embodiments, there is no limit on the number of generated sub-categories as the natural language processing module may generate any number of sub-categories.

The method 600 continues at operation 619 and the category module 240 associates the generated sub-categories with their respective categories for the one or more comments. The method 600 continues at operation 620 and the display module 250 generates a display of the determined categories for the particular transaction and the associated generated sub-categories, each sub-category being connected to their respective categories. For example, as depicted in FIG. 5, the display module 250 may generate a ring diagram that displays the selected categories from the comments in an inner ring 423 and displays the generated sub-categories on an outer ring 422 connected to the selected category for the comment on the inner ring 423.

Figure 7:
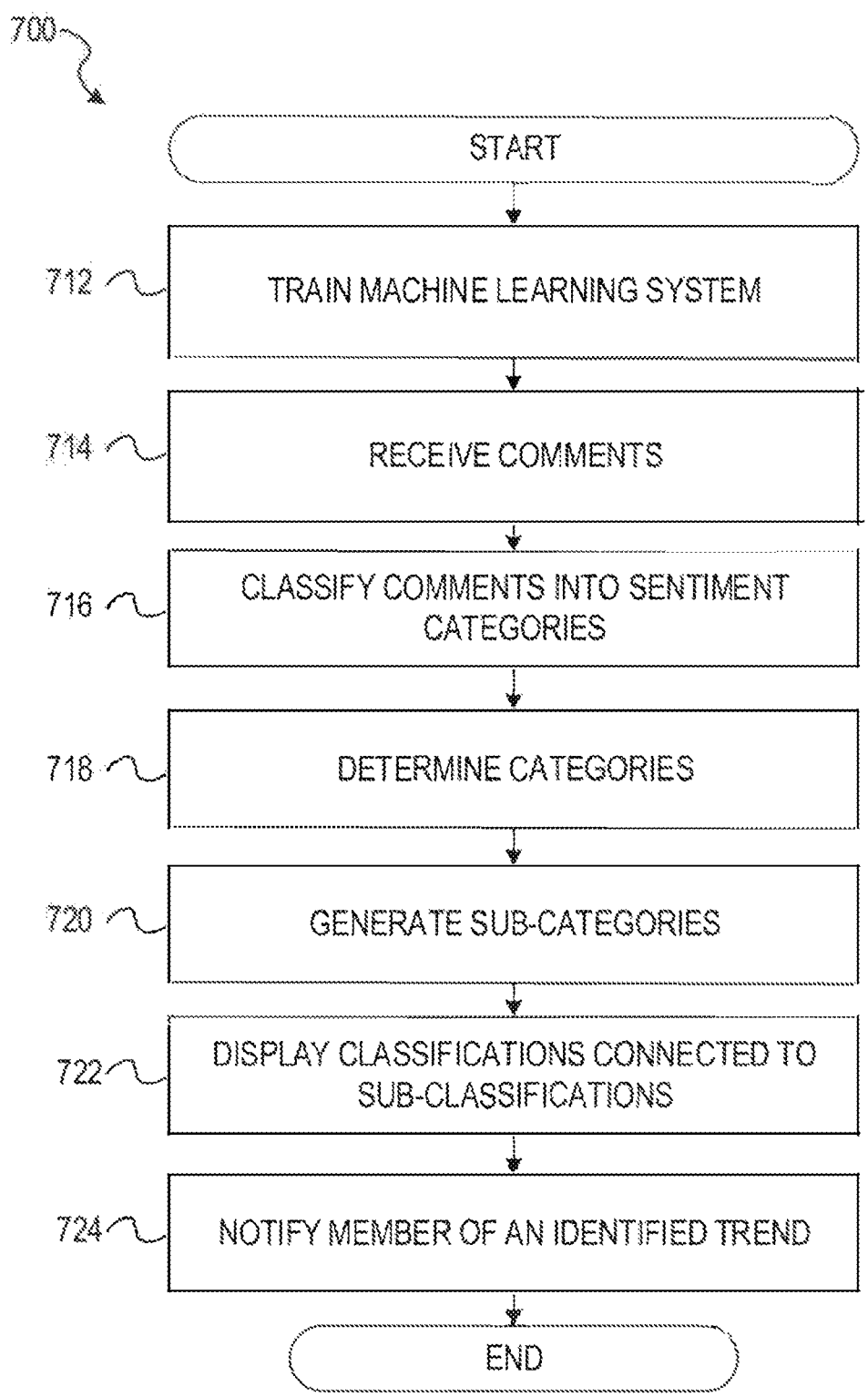
FIG. 7 is a flow chart diagram illustrating a method for processing feedback, according to another example embodiment.

FIG. 7 is a flow chart diagram illustrating a method for processing feedback, according to another example embodiment. Operations in the method 700 may be performed by the feedback system 150, using modules described above with respect to FIG. 3.

In one example embodiment, the method 700 begins and at operation 712, the feedback system 150 trains a machine learning system 270 to output a category in response to receiving text of a comment. In one example, the feedback system 150 loads a set of training data from a data storage device and trains a machine learning system 270 on the training data, as one skilled in the art may appreciate.

The method 700 continues and at operation 714, the collection module 220 retrieves comments from a remote database of comments for a particular phase of a transaction with a member of an online marketplace. For example, the collection module 220 may construct and submit an SQL query to the database 126 and receive comments that satisfy the conditions of the SQL query.

The method 700 continues at operation 716 and the sentiment module 230 classifies the comments into a sentiment classification. For example, the sentiment module 230 may classify the comment according to one or more selections at an electronic user interface (e.g., in an example where a user 106 specifically indicates a sentiment using the electronic user interface).

The method 700 continues at operation 718 and the category module 240 determines a category for each of the one or more comments in the plurality of the comments, the category selected from a set of predefined categories. The method 700 continues and at operation 720 and category module 240 applies a natural language processing module to the comment to generate a sub-category associated with the selected category. In certain embodiments, there is no limit on the number of generated sub-categories as the natural language processing module may generate any number of sub-categories, as one skilled in the art may appreciate.

The method 700 continues at operation 722 and the display module 250 generates a display of the determined categories for the particular transaction and the associated generated sub-categories, each sub-category being connected to their respective categories. For example, the display module 250 may generate a top row of categories and a second row of sub-categories where each of the sub-categories are connected to their respective categories. In this example embodiment, the display module 250 adjusts the size of graphical elements for the categories in order to accommodate the sub-categories.

The method 700 continues at operation 724 and the notification module 260 alerts the user 106 in response to a change in a trend in one of the categories. In one example embodiment, alerting the user 106 includes transmitting an email to the user 106, transmitting an SMS text message to the user 106, displaying a notification to the user 106 via an electronic graphical user interface, or any other electronic or digital communication, as one skilled in the art may appreciate.

Figure 8:
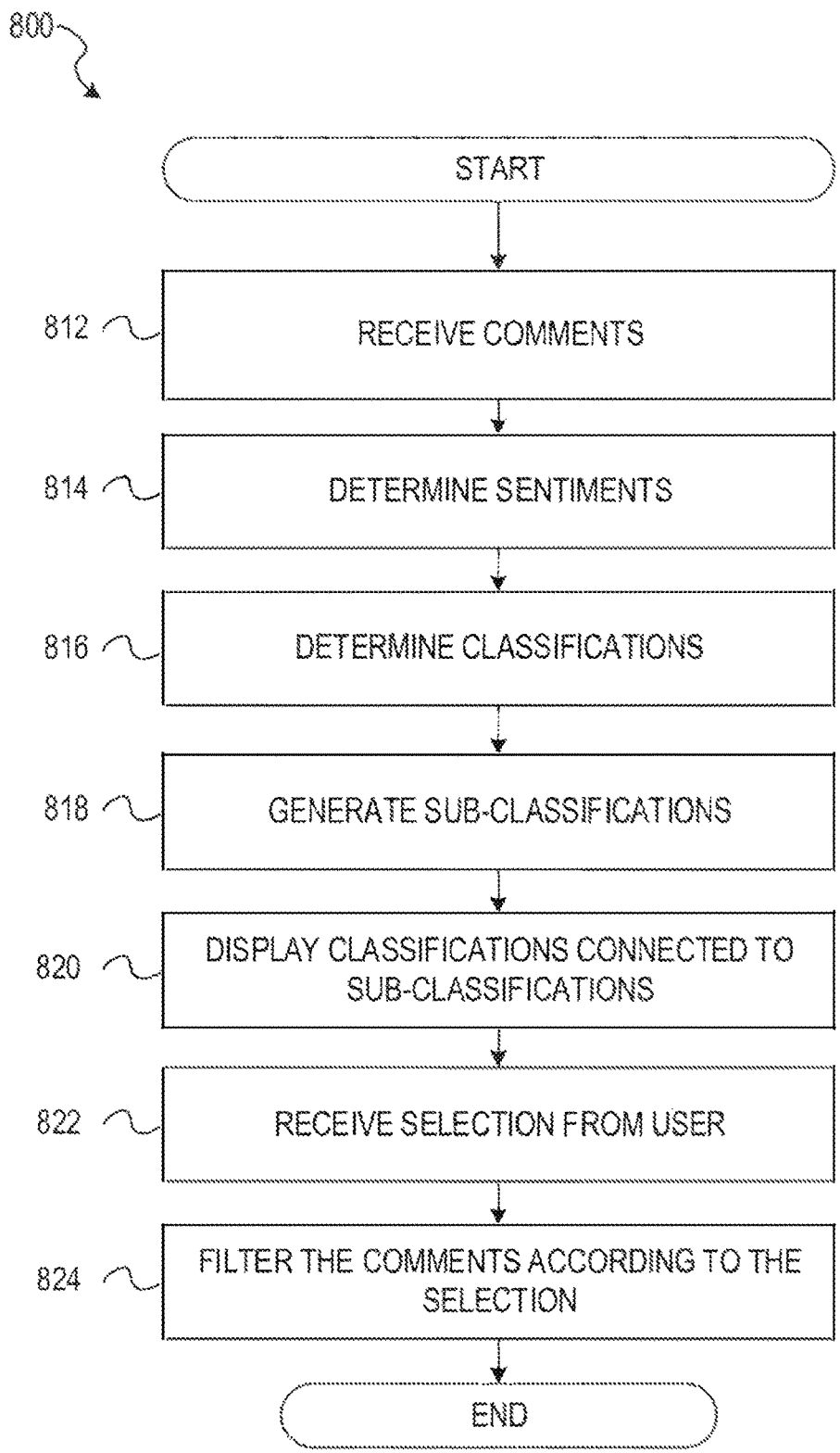
FIG. 8 is another flow chart diagram illustrating a method for processing feedback, according to one example embodiment.

FIG. 8 is another flow chart diagram illustrating a method 800 for processing feedback, according to one example embodiment. Operations in the method 800 may be performed by the feedback system 150, using modules described above with respect to FIGS. 2-5. In one example embodiment, the feedback system 150 begins the method 800 at operation 812 by receiving a plurality of comments at a particular phase of a transaction with a member of an online marketplace, as described herein. At operation 814, the feedback system 150 can determine a sentiment of one or more the received comments. At operation 816, the feedback system can determine a classification for one or more of the received comments based, for example, categories determined or identified by the feedback system 150. At operation 818, the feedback system can generate one or more sub-classifications or sub-categories. At operation 820, the feedback system can generate a graphical display illustrating the determined classifications and connections between the classifications and associated sub-classifications. At operation 822, the feedback system can receive a selection of category, a sub-category, of a feedback comment though the display. At operation 824, the feedback system can filter the feedback comments according the received selection. In one example, when a category is selected, the feedback system can modify the graphical display to show filtered feedback comments having a classification matching the selected category.

Machine and Software Architecture

The modules, methods, applications, and so forth described in conjunction with FIGS. 1-8 are implemented, in some embodiments, in the context of a machine and associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here, as those of skill in the art can readily understand how to implement the inventive subject matter in different contexts from the disclosure contained herein.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an application specific integrated circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 9:
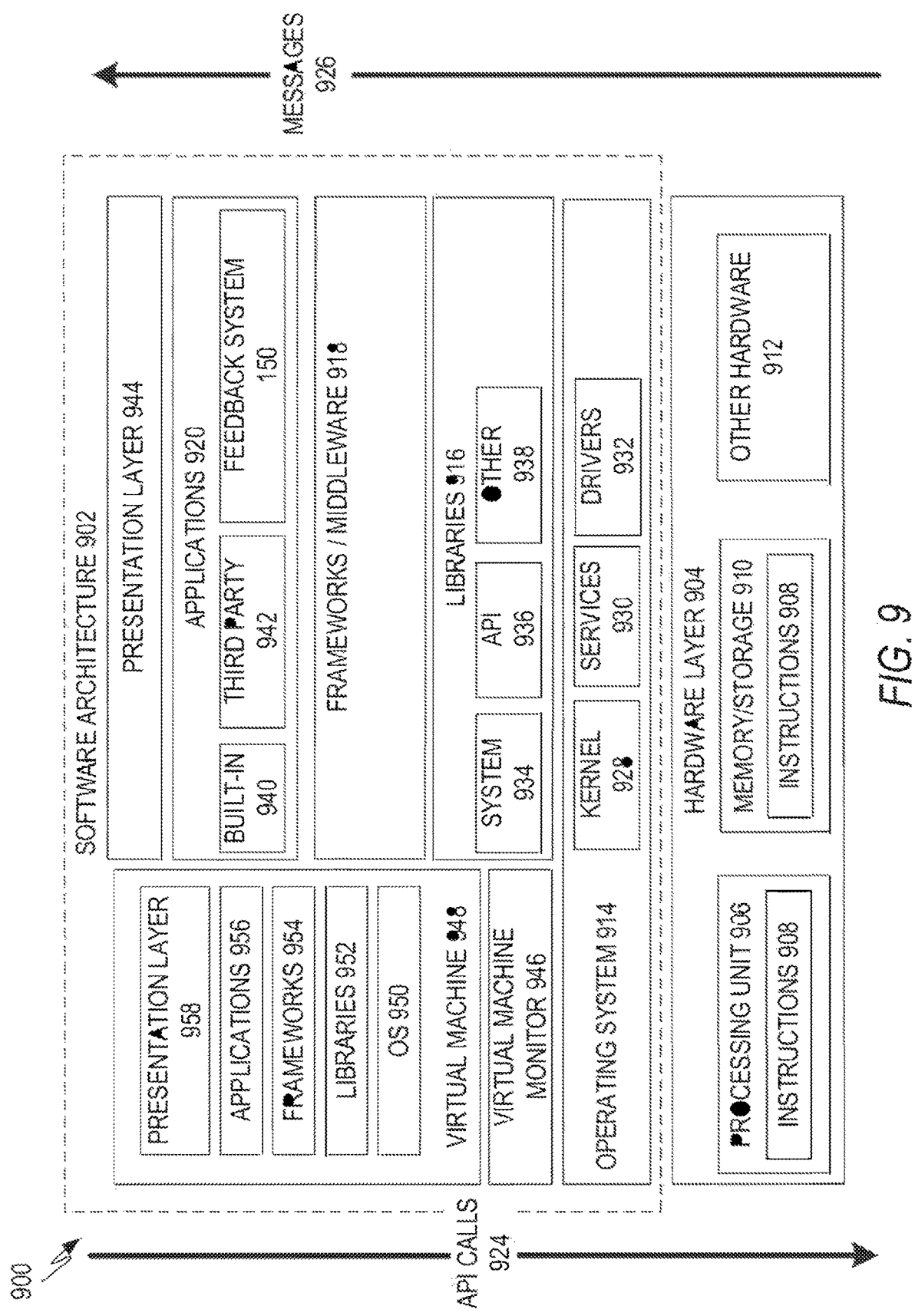
FIG. 9 is a block diagram illustrating an example of a software architecture that may be installed on a machine, according to some example embodiments.

FIG. 9 is a block diagram illustrating an example of a software architecture 900 that may be installed on a machine, according to some example embodiments. The software architecture 900 may be used in conjunction with various hardware architectures herein described. FIG. 9 is merely a non-limiting example of a software architecture and it will be appreciated that many other architectures may be implemented to facilitate the functionality described herein. The software architecture 900 may be executing on hardware such as machine 1000 of FIG. 16 that includes, among other things, processors 1010, memory 1030, and I/O components 1050. A representative hardware layer 904 is illustrated and can represent, for example, the machine 1000 of FIG. 10. The representative hardware layer 904 comprises one or more processing units 906 having associated executable instructions 908. Executable instructions 908 represent the executable instructions of the software architecture 902, including implementation of the methods, modules, and so forth of FIGS. 1-8. Hardware layer 904 also includes memory and/or storage modules 910, which also have executable instructions 908. Hardware layer 904 may also comprise other hardware as indicated by 912, which represents any other hardware of the hardware layer 904, such as the other hardware illustrated as part of machine 1000.

In the example architecture of FIG. 9, the software architecture 902 may be conceptualized as a stack of layers where each layer provides particular functionality. For example, the software architecture 902 may include layers such as an operating system 914, libraries 916, frameworks/middleware 918, applications 920, and presentation layer 944. Operationally, the applications 920 and/or other components within the layers may invoke API calls 924 through the software stack and receive a response, returned values, and so forth illustrated as messages 926 in response to the API calls 924. The layers illustrated are representative in nature and not all software architectures have all layers. For example, some mobile or special purpose operating systems may not provide a frameworks/middleware layer 918, while others may provide such a layer. Other software architectures may include additional or different layers.

The operating system 914 may manage hardware resources and provide common services. The operating system 914 may include, for example, a kernel 928, services 930, and drivers 932. The kernel 928 may act as an abstraction layer between the hardware and the other software layers. For example, the kernel 928 may be responsible for memory management, processor management (e.g., scheduling), component management, networking, security settings, and so on. The services 930 may provide other common services for the other software layers. The drivers 932 may be responsible for controlling or interfacing with the underlying hardware. For instance, the drivers 932 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 916 may provide a common infrastructure that may be utilized by the applications 920 and/or other components and/or layers. In one specific embodiment, the various modules of the feedback system 150 are implemented as an application 920. The libraries 916 typically provide functionality that allows other software modules to perform tasks in an easier fashion than to interface directly with the underlying operating system 914 functionality (e.g., kernel 928, services 930 and/or drivers 932). The libraries 916 may include system libraries 934 (e.g., C standard library) that may provide functions such as memory allocation functions, string manipulation functions, mathematic functions, and the like. In addition, the libraries 916 may include API libraries 936 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and/or three dimensional graphic content on a display), database libraries (e.g., SQLite that may provide various relational database functions), web libraries (e.g., WebKit that may provide web browsing functionality), and the like. The libraries 916 may also include a wide variety of other libraries 938 to provide many other APIs to the applications 920 and other software components/modules.

The frameworks 918 (also sometimes referred to as middleware) may provide a higher-level common infrastructure that may be utilized by the applications 920 and/or other software components/modules. For example, the frameworks 918 may provide various graphic user interface (GUI) functions, high-level resource management, high-level location services, and so forth. The frameworks 918 may provide a broad spectrum of other APIs that may be utilized by the applications 920 and/or other software components/modules, some of which may be specific to a particular operating system or platform. In one example embodiment, at least a portion of the 3D integration system 146 is implemented as middleware. In one example, the 3D model module is implemented as middleware and is accessible by any application 920.

The applications 920 include built-in applications 940 and/or third party applications 942. Examples of representative built-in applications 940 may include, but are not limited to, a contacts application, a browser application, a book reader application, a location application, a media application, a messaging application, and a game application, or other, or the like. Third party applications 942 may include any of the built in applications as well as a broad assortment of other applications. In a specific example, the third party application 942 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 942 may invoke the API calls 924 provided by the mobile operating system such as operating system 914 to facilitate functionality described herein.

The applications 920 may utilize built in operating system functions (e.g., kernel 928, services 930, and/or drivers 932), libraries (e.g., system 934, APIs 936, and other libraries 938), frameworks/middleware 918 to create user interfaces to interact with users 106 of the system. Alternatively, or additionally, in some systems, interactions with a user 106 may occur through a presentation layer, such as presentation layer 944. In these systems, the application/module "logic" can be separated from the aspects of the application/module that interact with a user 106.

Some software architectures utilize virtual machines. In the example of FIG. 9, this is illustrated by virtual machine 948. A virtual machine 948 creates a software environment where applications/modules can execute as if they were executing on a hardware machine (such as the machine 1000 of FIG. 10, for example). A virtual machine 948 is hosted by a host operating system (operating system 914 in FIG. 9) and typically, although not always, has a virtual machine monitor 946, which manages the operation of the virtual machine 948 as well as the interface with the host operating system (i.e., operating system 914). A software architecture executes within the virtual machine 948 such as an operating system 950, libraries 952, frameworks/middleware 954, applications 956 and/or presentation layer 958. These layers of software architecture 902 executing within the virtual machine 948 can be the same as corresponding layers previously described or may be different.

Example Machine Architecture and Machine-Readable Medium

Figure 10:
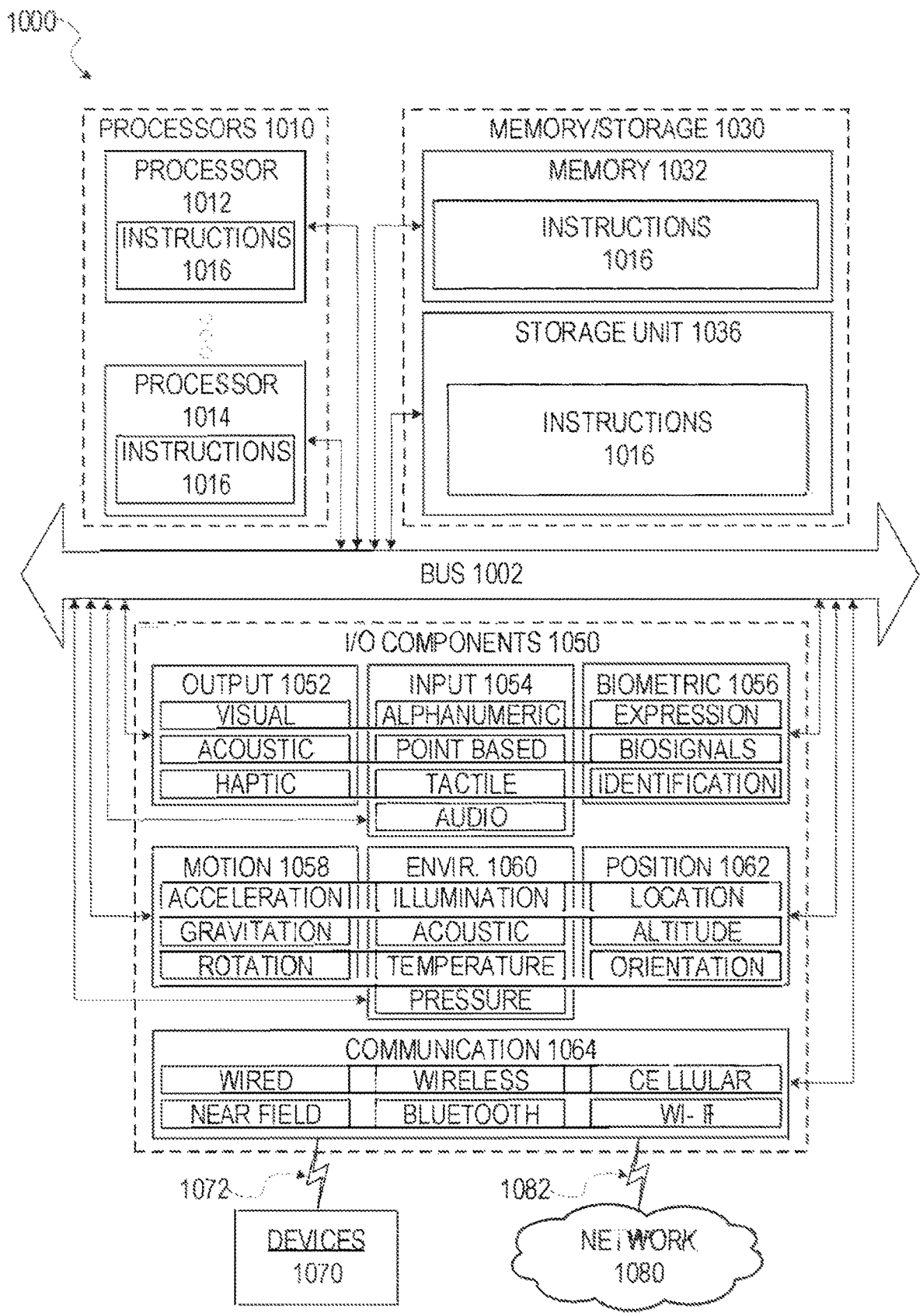
FIG. 10 illustrates a diagrammatic representation of a machine in the form of a computer system within which a set of instructions may be executed for causing the machine to perform any one or more of the methodologies discussed herein, according to an example embodiment.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1016 (e.g., software, a program, an application 920, an applet, an app, or other executable code) for causing the machine 1000 to perform any one or more of the methodologies discussed herein may be executed.

For example, the instructions 1016 may cause the machine 1000 to execute the flow diagrams of FIGS. 6-8. Additionally, or alternatively, the instructions 1016 may implement the modules depicted in FIG. 2 or FIG. 3. Specifically, the instructions 1016 may implement the various functions of the collection module 220, the sentiment module 230, the display module 250, the category module 240, the notification module 260, the machine learning system 270, or the weight module 280.

The instructions 1016 transform the general, non-programmed machine into a particular machine programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory 1030, and I/O components 1050, which may be configured to communicate with each other such as via a bus 1002. In an example embodiment, the processors 1010 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) may include, for example, processor 1012 and processor 1014 that may execute instructions 1016. The term "processor" is intended to include multi-core processors 1010 that may comprise two or more independent processors 1012, 1014 (sometimes referred to as "cores") that may execute instructions 1016 contemporaneously. Although FIG. 10 shows multiple processors 1010, the machine 1000 may include a single processor 1012 with a single core, a single processor 1012 with multiple cores (e.g., a multi-core processor), multiple processors 1012, 1014 with a single core, multiple processors 1012, 1014 with multiples cores, or any combination thereof.

The memory/storage 1030 may include a memory 1032, such as a main memory, or other memory storage, and a storage unit 1036, both accessible to the processors 1010 such as via the bus 1002. The storage unit 1036 and memory 1032 store the instructions 1016 embodying any one or more of the methodologies or functions described herein. The instructions 1016 may also reside, completely or partially, within the memory 1032, within the storage unit 1036, within at least one of the processors 1010 (e.g., within the processor's cache memory), or any suitable combination thereof, during execution thereof by the machine 1000. Accordingly, the memory 1032, the storage unit 1036, and the memory of processors 1010 are examples of machine-readable media.

As used herein, "machine-readable medium" means a device able to store instructions 1016 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database, or associated caches and servers) able to store instructions 1016. The term "machine-readable medium" shall also be taken to include any medium, or combination of multiple media, that is capable of storing instructions (e.g., instructions 1016) for execution by a machine (e.g., machine 1000), such that the instructions 1016, when executed by one or more processors of the machine 1000 (e.g., processors 1010), cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1050 may include a wide variety of components to receive input, provide output, produce output, transmit information, exchange information, capture measurements, and so on. The specific I/O components 1050 that are included in a particular machine 1000 will depend on the type of machine 1000. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion and the grouping is in no way limiting. In various example embodiments, the I/O components 1050 may include output components 1052 and input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1050 may include biometric components 1056, motion components 1058, environmental components 1060, or position components 1062 among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1062 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via coupling 1082 and coupling 1072, respectively. For example, the communication components 1064 may include a network interface component or other suitable device to interface with the network 1080. In further examples, communication components 1064 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1070 may be another machine or any of a wide variety of peripheral devices (e.g., a peripheral device coupled via a USB).

Moreover, the communication components 1064 may detect identifiers or include components operable to detect identifiers. For example, the communication components

1064 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1064, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1080 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1080 or a portion of the network 1080 may include a wireless or cellular network and the coupling 1082 may be a Code Division Multiple Access (CDMA) connection, a Global System for Mobile communications (GSM) connection, or other type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., hypertext transfer protocol (HTTP)). Similarly, the instructions 1016 may be transmitted or received using a transmission medium via the coupling 1072 (e.g., a peer-to-peer coupling) to devices 1070. The term "transmission medium" shall be taken to include any intangible medium that is capable of storing, encoding, or carrying instructions 1016 for execution by the machine 1000, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A computer implemented method comprising:
   receiving one or more comments associated with a transaction by a user;
   classifying, by at least one processor, at least one of the one or more comments into a sentiment classification;
   selecting, by the at least one processor, a first predefined category from a plurality of predefined categories for the one or more comments based at least in part on one or more terms in the one or more comments and the sentiment classification;
   generating, by the at least one processor, a sub-category of the first predefined category based at least in part on applying a natural language processing model to the one or more comments to identify a feedback topic associated with the one or more comments:
   identifying, by the at least one processor, trend data associated with the sub-category of the first predefined category based at least in part on the one or more comments and the sentiment classification; and
   transmitting the identified trend data associated with the sub-category of the first predefined category to a client device.

2. The method of claim 1, wherein transmitting the identified trend data comprises:
transmitting the identified trend data indicating that a number of comments associated with the first predefined category exceeds or does not exceed a comment threshold for a time period.

3. The method of claim 1, wherein transmitting the identified trend data comprises:
transmitting the identified trend data indicating a number of related comments associated with the first predefined category for a time period.

4. The method of claim 1, wherein transmitting the identified trend data comprises:
transmitting the identified trend data indicating a change in a comment trend associated with the first predefined category based at least in part on a change in a first number of comments for a first time period relative to a second number of comments for a second time period.

5. The method of claim 1, transmitting the identified trend data comprises:
transmitting an alert to the client device comprising the identified trend data in response to the identified trend data indicating a change associated with comments for the first predefined category.

6. The method of claim 5, wherein transmitting the alert to the client device comprises:
transmitting the alert that comprises an SMS text message, an email, a visual display notification, or any combination thereof.

7. The method of claim 1, further comprising:
determining one or more user feedback scores for the one or more comments; and
assigning one or more weights to the one or more comments based at least in part on the one or more user feedback scores, wherein the identified trend data comprises a first comment of the one or more comments having a weight that satisfies a threshold.

8. The method of claim 7, wherein determining the one or more user feedback scores for the one or more comments is based at least in part on a comment length, a sophistication of terms used, a grammar quality, whether a related purchase was made, an associated transaction, or a combination thereof.

9. An apparatus, comprising:
a processor,
memory coupled with the processor; and
instructions stored in the memory and executable by the processor to cause the apparatus to:
receive one or more comments associated with a transaction by a user;
classify at least one of the one or more comments into a sentiment classification;
select a first predefined category from a plurality of predefined categories for the one or more comments based at least in part on one or more terms in the one or more comments and the sentiment classification;
generate a sub-category of the first predefined category based at least in part on applying a natural language processing model to the one or more comments to identify a feedback topic associated with the one or more comments;
identify trend data associated with the sub-category of the first predefined category based at least in part on the one or more comments and the sentiment classification; and
transmit the identified trend data associated with the sub-category of the first predefined category to a client device.

10. The apparatus of claim 9, wherein the instructions to transmit the identified trend data are executable by the processor to cause the apparatus to:
transmit the identified trend data indicating that a number of comments associated with the first predefined category exceeds or does not exceed a comment threshold for a time period.

11. The apparatus of claim 9, wherein the instructions to transmit the identified trend data are executable by the processor to cause the apparatus to:
transmit the identified trend data indicating a number of related comments associated with the first predefined category for a time period.

12. The apparatus of claim 9, wherein the instructions to transmit the identified trend data are executable by the processor to cause the apparatus to:
transmit the identified trend data indicating a change in a comment trend associated with the first predefined category based at least in part on a change in a first number of comments for a first time period relative to a second number of comments for a second time period.

13. The apparatus of claim 9, wherein the instructions to transmit the identified trend data are executable by the processor to cause the apparatus to:
transmit an alert to the client device comprising the identified trend data in response to the identified trend data indicating a change associated with comments for the first predefined category.

14. The apparatus of claim 13, wherein the instructions to transmit the alert to the client device are executable by the processor to cause the apparatus to:
transmit the alert that comprises an SMS text message, an email, a visual display notification, or any combination thereof.

15. The apparatus of claim 9, wherein the instructions are further executable by the processor to cause the apparatus to:
determine one or more user feedback scores for the one or more comments; and
assign one or more weights to the one or more comments based at least in part on the one or more user feedback scores, wherein the identified trend data comprises a first comment of the one or more comments having a weight that satisfies a threshold.

16. The apparatus of claim 15, wherein the instructions to determine the one or more user feedback scores for the one or more comments are executable by the processor to cause the apparatus to:
determine the one or more user feedback scores for the one or more comments based at least in part on a comment length, a sophistication of terms used, a grammar quality, whether a related purchase was made, an associated transaction, or a combination thereof.

17. A non-transitory computer-readable medium storing code comprising instructions executable by a processor to cause an apparatus to perform operations comprising:
receiving one or more comments associated with a transaction by a user;
classifying at least one of the one or more comments into a sentiment classification;
selecting a first predefined category from a plurality of predefined categories for the one or more comments based at least in part on one or more terms in the one or more comments and the sentiment classification;

generating a sub-category of the first predefined category based at least in part on applying a natural language processing model to the one or more comments to identify a feedback topic associated with the one or more comments;

identifying trend data associated with the sub-category of the first predefined category based at least in part on the one or more comments and the sentiment classification; and transmitting the identified trend data associated with the sub-category of the first predefined category to a client device.

18. The non-transitory computer-readable medium of claim 17, wherein the instructions to transmit the identified trend data are executable by the processor to cause the apparatus to perform operation comprising:

transmitting the identified trend data indicating that a number of comments associated with the first predefined category exceeds or does not exceed a comment threshold for a time period.

19. The non-transitory computer-readable medium of claim 17, wherein the instructions to transmit the identified trend data are executable by the processor to cause the apparatus to perform operation comprising:

transmitting the identified trend data indicating a number of related comments associated with the first predefined category for a time period.

20. The non-transitory computer-readable medium of claim 17, wherein the instructions to transmit the identified trend data are executable by the processor to cause the apparatus to perform operation comprising:

transmitting the identified trend data indicating a change in a comment trend associated with the first predefined category based at least in part on a change in a first number of comments for a first time period relative to a second number of comments for a second time period.

\* \* \* \* \*